(12) United States Patent
Marchildon (10) Patent No.: US 8,359,789 B2
(45) Date of Patent: *Jan. 29, 2013

(54) PLANT GROWING APPARATUS AND METHOD

(75) Inventor: Ted Marchildon, Qualicum Beach (CA)

(73) Assignee: Betty Storey, Qualicum Beach (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/349,310

(22) Filed: Jan. 12, 2012

(65) Prior Publication Data

US 2012/0124904 A1    May 24, 2012

Related U.S. Application Data

(63) Continuation of application No. 10/535,225, filed as application No. PCT/CA03/01789 on Nov. 19, 2003, now Pat. No. 8,104,226.

(30) Foreign Application Priority Data

Nov. 19, 2002  (CA) ..................................... 2412073

(51) Int. Cl.
 *A01G 9/02*  (2006.01)
 *A01G 9/12*  (2006.01)
(52) U.S. Cl. ............................. 47/79; 47/39; 47/58.1 LS
(58) Field of Classification Search ................ 47/17, 39, 47/48.5, 58.1 FV, 58.1 LS, 59 R, 60–61, 47/62 R, 63, 79, 82, 83, 86
See application file for complete search history.

(56) References Cited

U.S. PATENT DOCUMENTS

| | | | |
|---|---|---|---|
| 3,882,634 A * | 5/1975 | Dedolph | 47/65 |
| 3,909,978 A * | 10/1975 | Fleming | 47/82 |
| 3,973,353 A * | 8/1976 | Dedolph | 47/65 |
| 5,862,628 A * | 1/1999 | Takashima | 47/65.8 |
| 6,604,321 B2 * | 8/2003 | Marchildon | 47/62 R |
| 6,840,007 B2 * | 1/2005 | Leduc et al. | 47/62 C |
| 7,415,796 B2 * | 8/2008 | Brusatore | 47/82 |
| 7,533,493 B2 * | 5/2009 | Brusatore | 47/82 |
| 7,559,173 B2 * | 7/2009 | Brusatore | 47/82 |
| 7,818,917 B2 * | 10/2010 | Brusatore | 47/59 R |
| 7,984,586 B2 * | 7/2011 | Brusatore | 47/59 R |
| 2002/0144461 A1 | 10/2002 | Marchildon | |

FOREIGN PATENT DOCUMENTS

| | | |
|---|---|---|
| CA | 2401737 | 8/2004 |
| JP | 51-13653 | 2/1976 |
| JP | 51-145743 | 12/1976 |
| JP | 57-167657 | 10/1982 |
| JP | 60-94035 | 5/1985 |
| JP | 62-190449 | 12/1987 |
| JP | 6-60331 | 8/1994 |

OTHER PUBLICATIONS

Perelman J.I., Diverting Physics, Book 1, 12th Edition, Moscow "Nauka" Publishing, 1979, p. 64, and English translation.

* cited by examiner

*Primary Examiner* — Rob Swiatek
*Assistant Examiner* — Ebony Evans
(74) *Attorney, Agent, or Firm* — Oyen Wiggs Green & Mutala LLP (57) ABSTRACT

A plant-growing apparatus has a plurality of rotatable plant-growing modules which can be moved between two positions, separated vertically or horizontally. Each module comprises a cylindrical structure for holding plant-growing containers in which the plants grow radially inwardly of the cylindrical structure toward a light source. The apparatus has module support means for supporting each module and rotating it in a substantially horizontal position. The apparatus has module moving means, for example sprocket driven chains, for conveying the modules between the two positions.

9 Claims, 8 Drawing Sheets

PLANT GROWING APPARATUS AND METHOD

CROSS-REFERENCE TO RELATED APPLICATIONS

This is a continuation of my prior application Ser. No. 10/535,225 filed May 16, 2006, issued as U.S. Pat. No. 8,104,226 on Jan. 31, 2012, which is incorporated herein by reference.

TECHNICAL FIELD

The invention pertains to an apparatus and method for growing plants. In particular, it pertains to an apparatus comprising a plurality of rotatable cylindrical plant-growing structures in which plants grow radially inwardly of the structures.

BACKGROUND

When plants are grown in a flat bed under a lamp, the plants are at varying distances from the lamp. Greater efficiency in the use of the light is obtained where all the plants being illuminated by a given light source are equidistant from it, reducing the number of lights needed for each productive square unit of growing area. This can be achieved by means of a rotary growing apparatus in which the plants are rotated about a light source at the axis of rotation.

U.S. Pat. No. 6,604,321 (Marchildon) discloses a rotary plant-growing apparatus with an open-ended cylindrical drum which rotates about a horizontal axis on a support stand. A lamp is positioned at the axis of the drum. Holes in the drum hold plant pots, with the plants facing the light and the bottom of the pots extending radially outward from the drum. A tray under the drum holds a pool of water and is spaced from the drum such that the lower part of the pots contacts the water as the drum rotates, watering the plants.

Canadian published patent application 2,401,737 (Poirier et al.) discloses a rotary growing apparatus which comprises a cylindrical structure or drum provided with a series of parallel elongated, longitudinally extending baskets for holding plants. A support base is provided for the drum, and a drive mechanism rotates the drum on the support base about the drum's rotational axis. A light source is positioned inside the drum. A feeding system provides nutrient fluid to the growing plants as the drum rotates and the baskets contact the nutrient fluid. The elongated baskets define in the bottom and side walls thereof a plurality of apertures for allowing the nutrient fluid to access the plants. The elongated baskets are removably attached to a pair of parallel and opposed rims of the drum by means of tubular members with resilient attachment pins at the ends thereof.

Although rotary growing machines of the foregoing types reduce the amount of floor space required for growing a given number of plants, as compared to traditional methods of using flat beds or trays of plants, much more efficient use of floor area could be achieved by providing for movement of rotary plant-growing modules from one point to another while the machines continue to operate. For example, if the plant-growing machines can be moved vertically, a plurality of such machines could be operated in less floor space than they would occupy if placed on a floor. Also, in some situations, floor space could be saved by providing for horizontal movement of a plurality of plant-growing machines, for example moving them between areas where there is insufficient space for servicing them and an area where they can be serviced. It would be desirable to provide a plant-growing apparatus for effecting movement of a plurality of such machines from one point to another while the machines continue to operate.

SUMMARY OF INVENTION

According to one embodiment of the invention, there is provided a plant-growing apparatus having a plurality of rotatable plant-growing modules which can be moved vertically. The apparatus has a plurality of the rotatable plant-growing modules. Each module comprises a cylindrical structure for holding plant-growing containers. The plants grow in the containers radially inwardly of the cylindrical structure toward a light source inside the module and roots of the plants grow radially outwardly of the module. The apparatus has module support means for supporting each module and rotating it about its longitudinal axis in a substantially horizontal position. The apparatus has module moving means for conveying the module support means and the modules along a path between a vertically higher and a vertically lower position. The apparatus also includes water feeding means for feeding water or nutrient solution to the plants.

According to a further embodiment of the invention, there is provided a plant-growing apparatus having a plurality of rotatable plant-growing modules which can be moved horizontally. The modules and module support means are as aforesaid and the apparatus has module moving means for conveying the module support means and modules along a generally horizontal path. The apparatus also includes water feeding means for feeding water or nutrient solution to the plants.

The invention also provides a method of growing plants. Plant material is placed in a growing medium and the medium is placed in a rotatable growing apparatus such that plants grow radially inwardly of the apparatus. A light source is illuminated inside the rotatable growing apparatus. The apparatus is rotated about the light source. The apparatus is moved along a path between two separate positions. Water is delivered to the growing medium.

These and other features of the invention will be apparent from the following description of the preferred embodiments, considered along with the accompanying drawings.

DESCRIPTION OF THE PREFERRED EMBODIMENTS

Corresponding and like parts are referred to in the following description and indicated in the drawings by the same reference characters.

Figure 1:
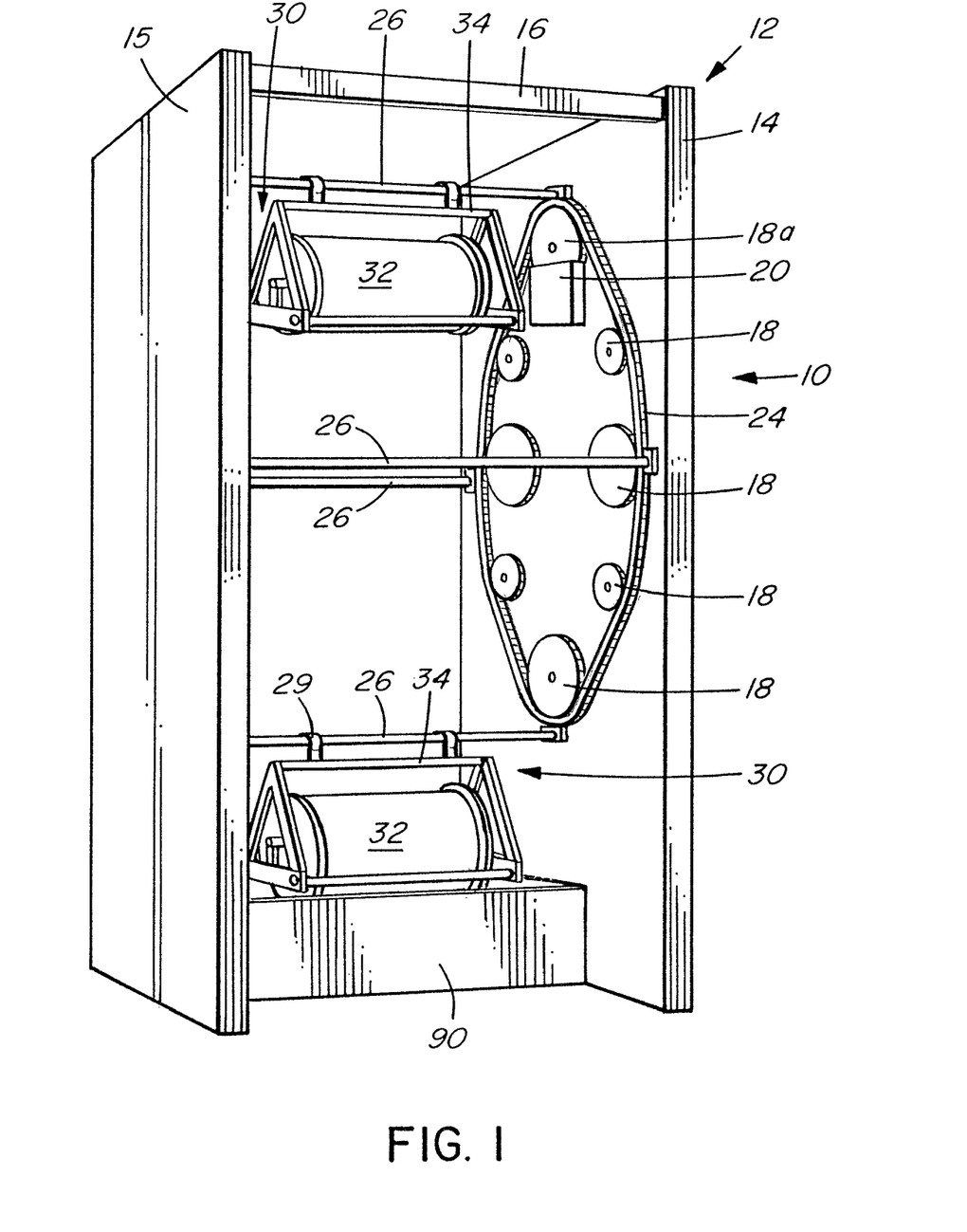
FIG. 1 is a perspective view of a preferred embodiment of the plant-growing apparatus.
Figure 2:
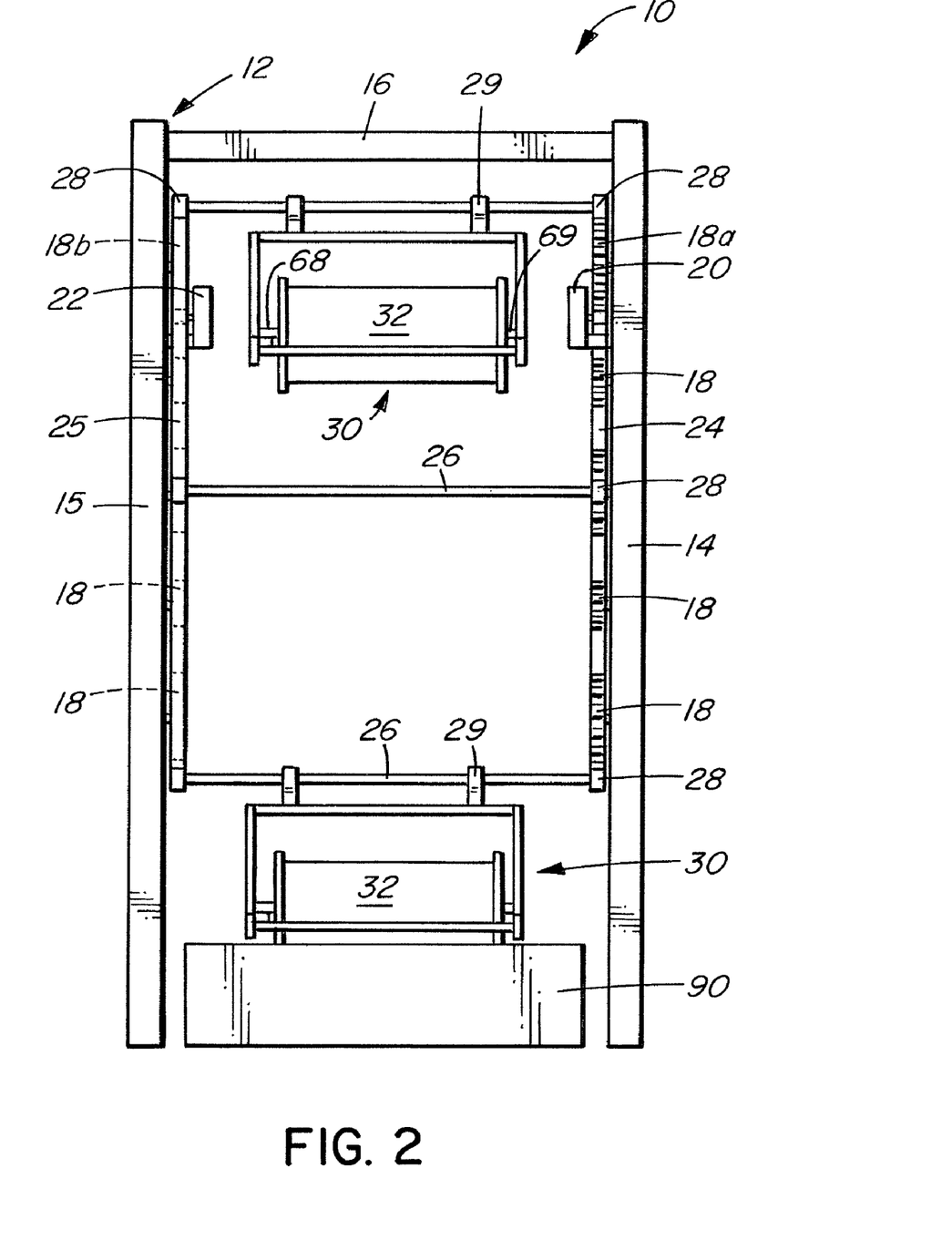
FIG. 2 is a front elevation view thereof.

Referring to FIGS. 1 and 2, plant growing apparatus 10 has a frame 12 comprising side frame members 14, 15 braced together by a plurality of frame member 16. Each frame member 14 rotatably supports a set of sprocket wheels 18 configured in a generally oval or racetrack-shaped array. Sprocket drive means 20 and 22 on frame members 14, 15 respectively, comprise a motor and appropriate gear and control means to synchronously turn the sprocket wheels 18a and 18b on frame members 14 and 15 respectively.

Figure 3:
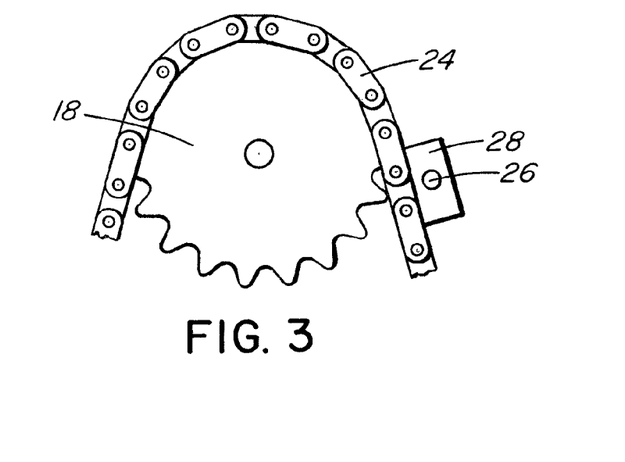
FIG. 3 is an elevation view of a sprocket and chain of the apparatus of FIG. 1.
Figure 4:
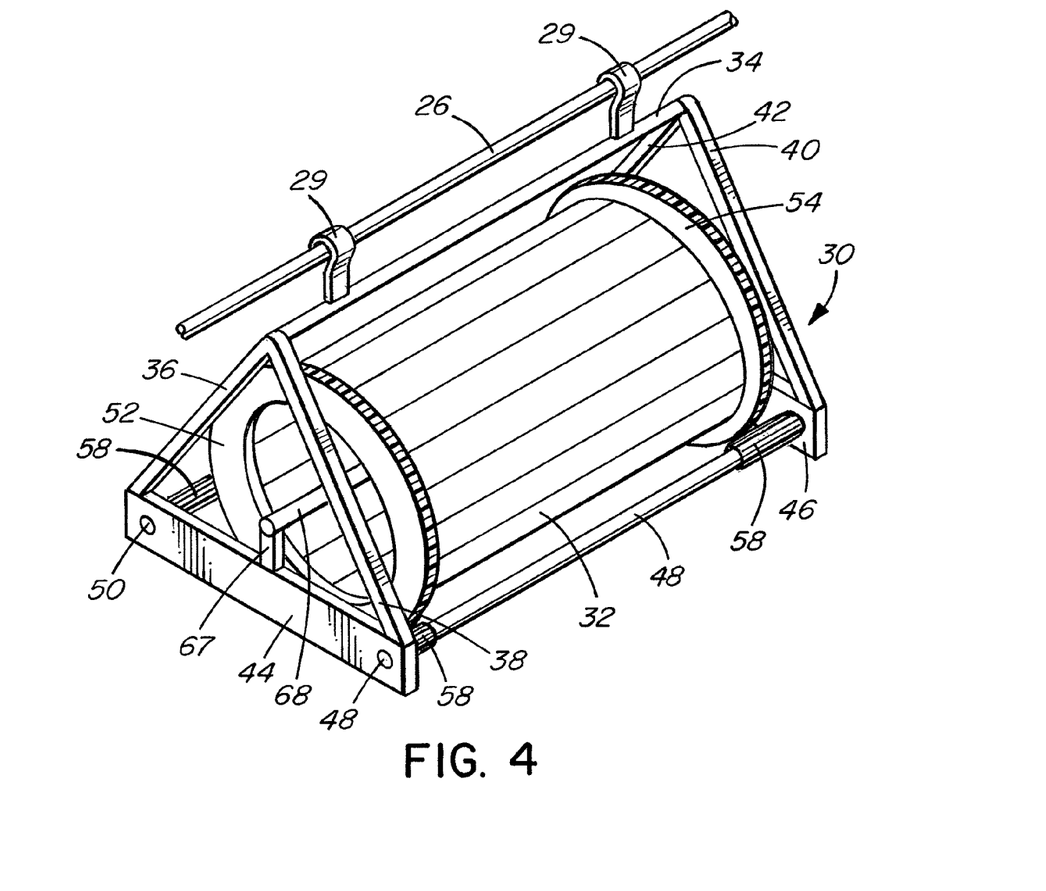
FIG. 4 is a perspective view of a plant-growing module and support means of the apparatus of FIG. 1.
Figure 5:
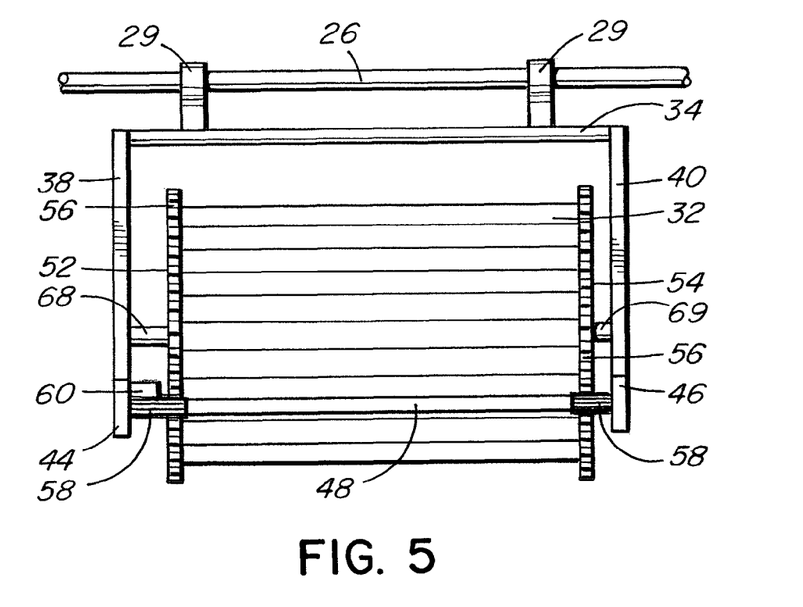
FIG. 5 is a side elevation view of the module and support means of FIG. 4.
Figure 6:
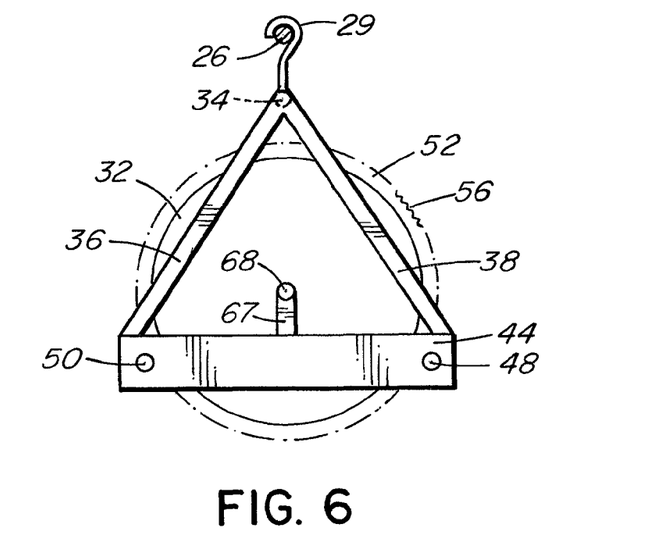
FIG. 6 is an end elevation view of the module and support means of FIG. 4.

Chains 24, 25 are operatively fitted on the sets of sprocket wheels 18 on frame members 14 and 15 respectively. A plurality of module support bars 26 are affixed, as shown in FIG. 3, by means of bracket 28, to chains 24, 25 and extend therebetween.

A module support frame 30 is hung by hanger means 29 from each support bar 26. For clarity of illustration, FIGS. 1 and 2 show only four support bars 26 and only two module support frames 30, but it will be understood that apparatus 10 may comprise many support bars 26 each holding a module support frame.

Referring to FIGS. 4 to 7, module support frame 30 is structured to rotatably support cylindrical plant-growing module 32. Support frame 30 has a generally horizontal frame member 34, angled frame members 36, 38 at one end and 40, 42 at the other end, and lower horizontal members 44, 46. Rotatable horizontal members 48, 50 extend between lower horizontal members 44, 46 and support module 32.

Figure 7:
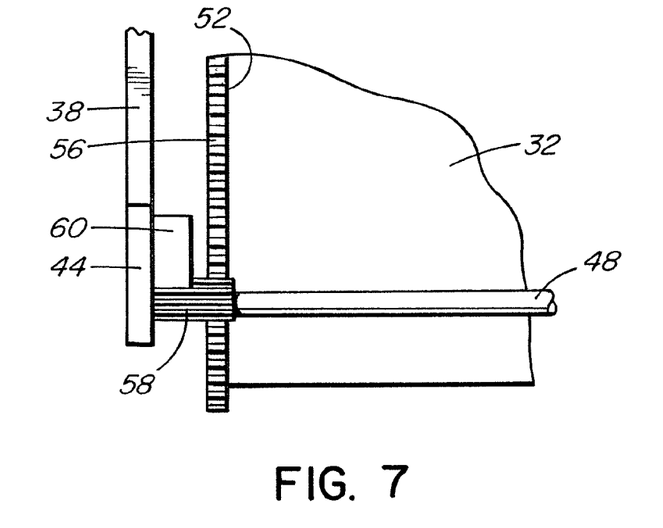
FIG. 7 is a side elevation view of a portion of the module and support means of FIG. 4.

End rims 52, 54 of module 32 extend radially outward beyond the remainder of the module and have gear teeth 56 on their outer edge. As best seen in FIG. 7, the rims 52, 54 rest on rotatable members 48, 50 and gear teeth 56 engage with gear teeth 58 on rotatable members 48, 50. Drive means 60 on frame member 44 respectively comprises a motor and appropriate gear and control means to turn rotatable member 48. As it is turned, module 32 is rotated about its longitudinal axis.

Support member 67 on frame member 44 holds lamp 68 which extends longitudinally into module 32 in a generally axial position. An identical support member and lamp 69 are provided on frame member 46, so lamp 69 extends into module 32 from the opposite end. Each lamp 68, 69 extends slightly less than half way into module 32, to provide full, axial illumination for the plants growing inside the module.

Figure 8:
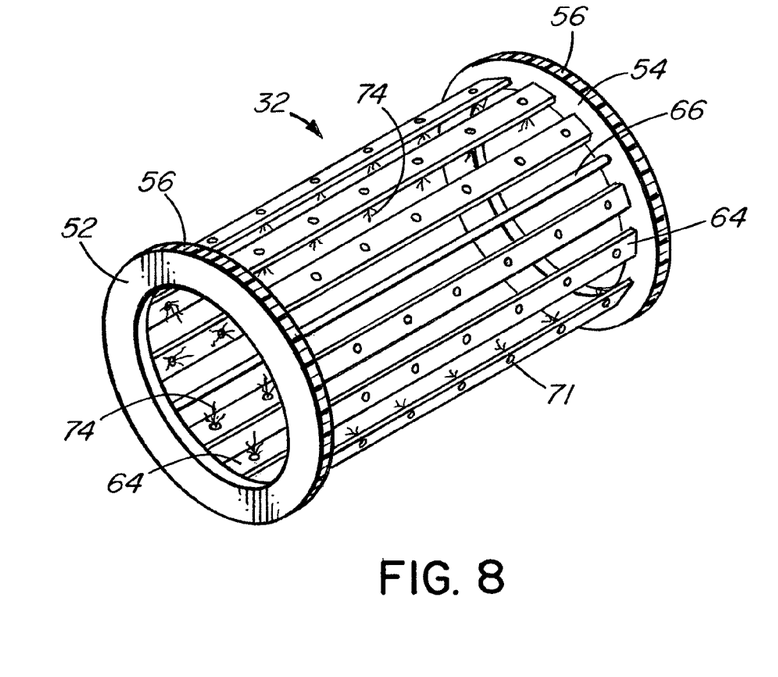
FIG. 8 is a perspective view of an embodiment of the plant-growing module.
Figure 9:
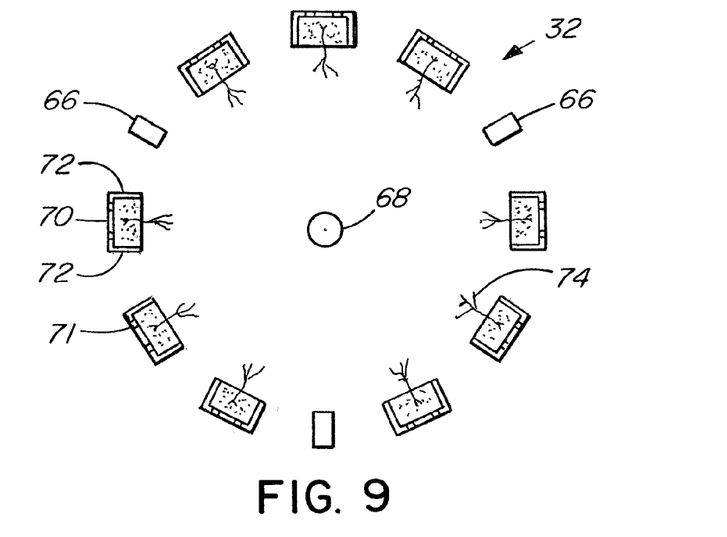
FIG. 9 is a cross-sectional view of the module of FIG. 8.

Module 32 is adapted to hold plants so they can grow hydroponically or aeroponically and be oriented to grow radially inwardly of the module toward the lights 68, 69 located inside the module, while their roots grow radially outwardly. Various forms of module are suitable for use in the invention. In one embodiment, shown in FIGS. 8 and 9, module 32 is a cylindrical structure which comprises rims 52, 54 with a plurality of plant-growing trays 64 detachably fastened (by suitable latch means, not shown in the drawings) at their ends to the rims. Support members 66 also extend between the rims. Trays 64 have a bottom wall 70 with holes 71 to permit the entry of water, and side walls 72, and are adapted to receive and retain a growing medium in which plants 74 can grow.

Figure 10:
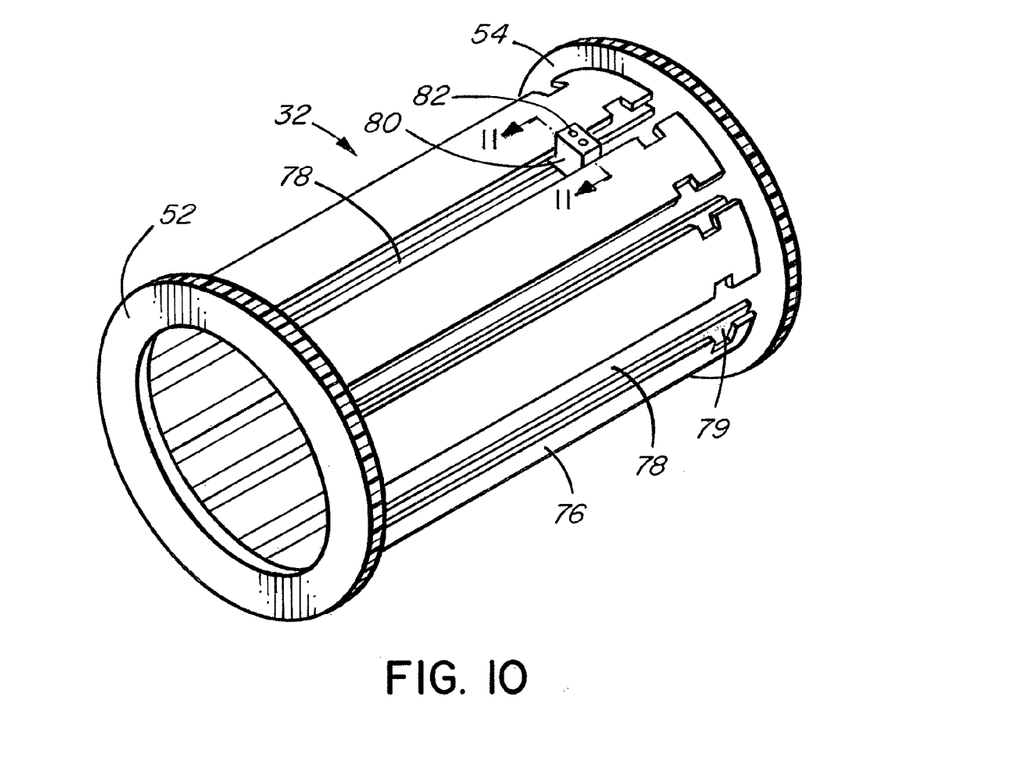
FIG. 10 is a perspective view of another embodiment of the plant growing-apparatus.
Figure 11:
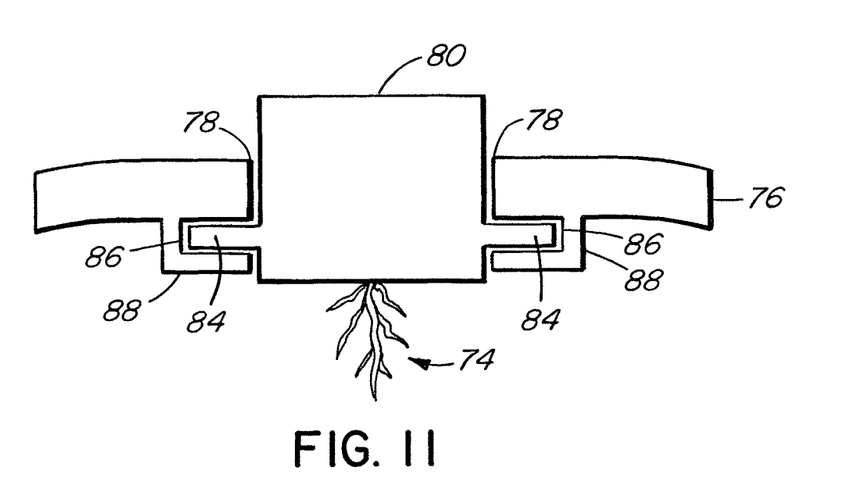
FIG. 11 is a cross-sectional view on the line 11-11 of FIG. 10.

In another embodiment of the module, shown in FIGS. 10 and 11, the module 32 has cylindrical wall 76 connecting rims 52, 54. Longitudinal slots 78 in the wall 76 have at least one opening 79 adapted to permit the slidable insertion and removal of plant-growing containers 80. For clarity of illustration, a single container 80 is shown in FIG. 10, but it will be understood that, in use, slots 78 are filled with containers 80, placed side by side. Each container 80 is configured to hold a plant. It has an opening (not shown) for plant 74 to grow out of and a bottom opening 82 for the inflow of water. Container 80 has an outwardly-extending flange 84 on each of two opposite sides thereof adapted to fit in opening 79 and slidingly engage longitudinal channel 86 formed between wall 76 and L-shaped bracket 88 which is attached to the inside of longitudinal wall 76.

Alternatively, the cylindrical structure can be of the type shown in U.S. Pat. No. 6,604,320 (Marchildon).

In plant growing apparatus 10, means are provided for conveying water and nutrients to the plants. As shown in FIGS. 1 and 2, water trough 90 is positioned at the base of the apparatus 10 so that, when a plant-growing module 32 is in its vertically lowest position, the bottom part of the module 32 will be positioned in the trough 90. The water level in the trough is maintained such that the openings in the bottom of the plant-growing containers at the lower end of the module will be under the surface, permitting water to flow into the plant-growing medium in the containers.

Figure 12:
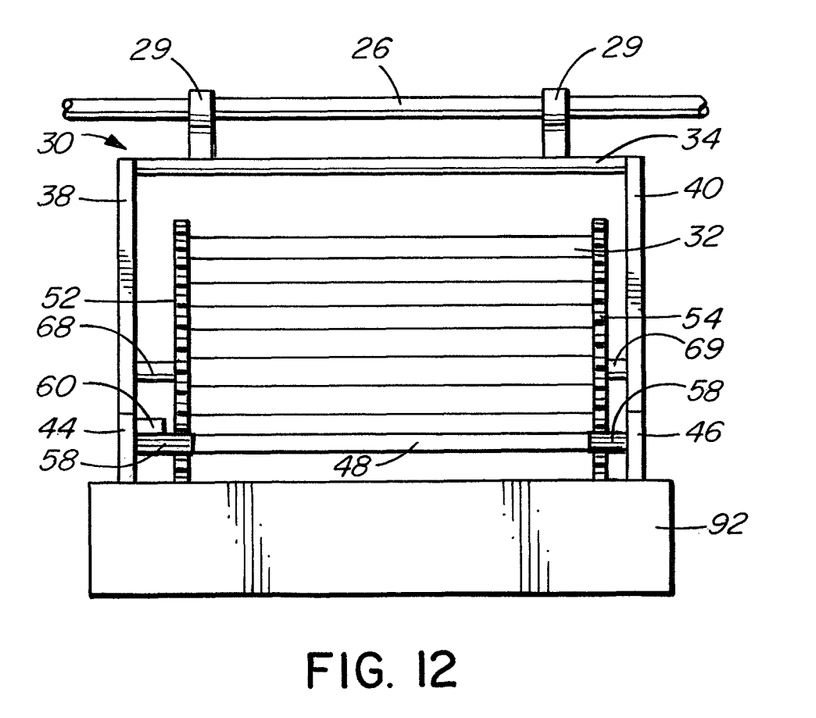
FIG. 12 is a side elevation view of an embodiment of the plant-growing module and support means module of FIG. 4 having a separate water trough.

In an alternative embodiment, shown in FIG. 12, each module has its own water trough and there would be no trough at the base of the apparatus 10. Here, the water-conveying means comprises a trough 92 supported by the horizontal members 44, 46 of the module support frame 30. Again, the water level in the trough 92 is maintained to permit water to flow into the plant-growing medium in the containers as they are rotated down into the trough.

Alternatively, water-feeding means can comprise suitably positioned sprayers, injectors or any other convenient means for delivering water and nutrients to the plant-growing medium. If desired, water trough 90 can be supplemented by sprayers, etc. located at an upper region of the plant growing apparatus 10, to ensure that the plants are watered with sufficient frequency.

Referring again to the embodiment of FIG. 1, the plant growing apparatus 10 is used, once plant-growing medium with plant material is positioned in the modules 32, by actuating drive means 20, 22 to rotate sprocket wheels 18a, 18b, moving chains 24, 25 and with them modules 32, through a revolution. The speed of revolution, and also the speed of rotation of each module, is selected such that the plant-growing containers are watered as often as required. The apparatus can be operated continuously or intermittently and in either direction of travel of the chains 24, 25.

Since the modules continue to operate, i.e. to rotate about their respective lights and grow plants, while they are in all positions on the circuit traveled by chains 24, 25, it will be apparent that the apparatus permits the operation of many plant-growing modules in the limited floor space occupied by apparatus 10, less floor space than the modules would occupy if operated on a floor.

To service the modules, for example to harvest plants, insert plant material or plant-growing containers, etc., or to do mechanical servicing, the drive means 20, 22 are stopped when the module to be serviced is at a position where it can be conveniently reached, for example near the lower part of the circuit. If necessary, it can be removed from the apparatus by releasing hanger 29 from support rod 26.

Where each module has its own water trough, as in FIG. 12, it is not necessary to revolve the apparatus 10 to achieve watering of the plants, and the drive means 20, 22 would typically be operated only to bring the modules into position for servicing.

Figure 13:
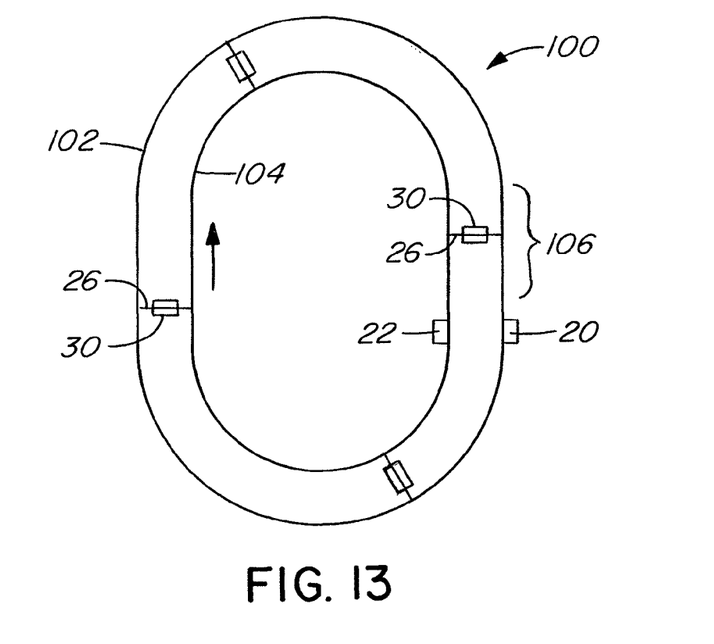
FIG. 13 is a top plan view of an embodiment of the plant-growing apparatus that provides for generally horizontal movement of the plant-growing modules.
Figure 14:
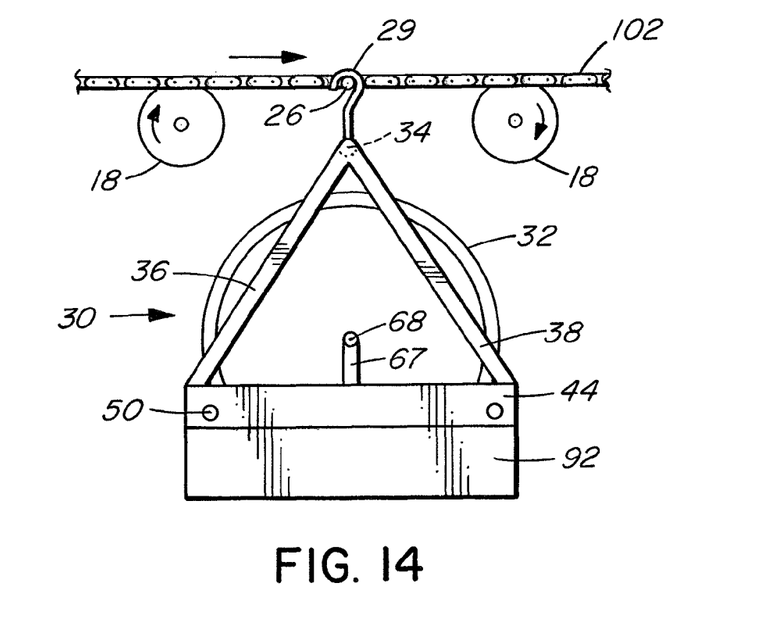
FIG. 14 is a side elevation view of a portion of the apparatus of FIG. 13.

In an alternative embodiment, the invention provides an apparatus for generally horizontal movement of the plant-growing modules. When plant-growing modules are simply positioned on a base that is stationary on a floor, as in the prior art, for example U.S. Pat. No. 6,604,321 (Marchildon), they must be accessible for servicing, which requires floor space around them. By providing means for movement of the modules, while they continue to operate, floor space can be saved, for example by moving them between a location where they are not accessible to servicing and a location where they are. Referring to FIGS. 13 and 14, plant-growing apparatus 100 has a pair of sprocket-driven chains 102, 104, preferably but not necessarily operating on an endless track. Drive means 20 and 22 comprise a motor and appropriate gear and control means to synchronously turn a sprocket wheel 18 on each track to drive chains 102, 104 respectively. Support bars 26 are attached at their ends to the respective chains (by brackets, not shown, as in the embodiment of FIG. 1) and extend therebetween. A module support frame 30 with plant-growing module 32, as described above, is suspended from each support bar 26, as in the embodiment of FIG. 1. Preferably, the plant-growing module is of the type shown in FIG. 12, in which a water trough 92 is supported by each module support means.

The track of the apparatus 100 includes section 106 in which a module 32 becomes accessible for servicing by a user. Modules in the remainder of the track need not be accessible for servicing.

In operation, sprocket drive means 20, 22 are actuated, moving chains 102, 104 synchronously and, with them, modules 32, between section 106 where the modules can be serviced, and the remainder of the track. Chains 102, 104 are of a type that permits movement about a radius so that the track can form an endless loop. Alternatively, belts may be used instead of chains, and be supported and driven by pulley wheels adapted to carry belts, to facilitate a track which turns about a radius.

In an alternative embodiment of apparatus 100, in which the modules 32 do not have individual water troughs, water-feeding means can comprise suitably-positioned sprayers, injectors or any other convenient means for delivering water and nutrients to the plant-growing medium. If desired, a water trough can be provided at one or more positions below the track, and be raised as a module 32 is moved into position over it, permitting water to flow into the plant-growing medium in the containers as they are rotated down into the trough.

Although the invention has been described in terms of various embodiments, it is not intended that the invention be limited to these embodiments. Various modifications within the scope of the invention will be apparent to those skilled in the art. For example, although endless tracks of chains have been described above, the tracks need not be endless, as the modules can be moved either vertically or horizontally along a track which ends and then be moved back along the same track. Also, the module moving means need not comprise chains, as belts and other mechanical configurations can be used. Further, the module moving means in the embodiment of the apparatus for horizontal movement of the modules can comprise a single chain (or belt) from which the modules are suspended, two spaced-apart chains not being essential. The scope of the invention is defined by the claims that follow.

What is claimed is:

1. A method of growing plants comprising the steps of:
    (a) placing a growing medium with plant material in a rotatable growing module comprising a cylindrical structure with a light source inside the cylindrical structure such that plants grow radially inwardly of said cylindrical structure toward the light source;
    (b) illuminating the light source;
    (c) rotating the cylindrical structure about the light source;
    (d) moving the rotatable growing module along a path between two separated positions; and
    (e) delivering water to the growing medium.

2. A method according to claim 1, wherein the two separated positions are a vertically higher position and a vertically lower position.

3. A method according to claim 1, wherein the two separated positions are two horizontally separated positions.

4. A method according to claim 1, wherein the path is a circuit extending between a plurality of positions that are both vertically and horizontally separated from each other.

5. A method according to claim 4, wherein the circuit is a closed circuit and the rotatable growing module is moved in a revolution around the circuit.

6. A method according to claim 5, wherein the rotatable growing module is one of a plurality of such modules, further comprising the step of moving the other such modules along said path.

7. A method according to claim 5, wherein the circuit is a distance greater than the diameter of the cylindrical structure.

8. A method according to claim 1, wherein the rotatable growing module is one of a plurality of such modules, further comprising the step of moving the other such modules along said path.

9. A method according to claim 1, wherein the path is a distance greater than the diameter of the cylindrical structure.

* * * * *